US 8,366,265 B2

(12) United States Patent
Shapiro (10) Patent No.: US 8,366,265 B2
(45) Date of Patent: Feb. 5, 2013

(54) VISION ASSIST DEVICE WITH AN INTEGRAL CARABINER AND OPTIONAL LIGHT

(76) Inventor: Samuel R. Shapiro, Monroeville, PA (US)

( * ) Notice: Subject to any disclaimer, the term of this patent is extended or adjusted under 35 U.S.C. 154(b) by 444 days.

(21) Appl. No.: 12/657,093

(22) Filed: Jan. 13, 2010

(65) Prior Publication Data

US 2011/0170048 A1   Jul. 14, 2011

(51) Int. Cl.
   *G02C 3/04* (2006.01)
(52) U.S. Cl. .......................................... 351/56; 351/158
(58) Field of Classification Search ................... 351/158, 351/112, 111, 59, 41, 56; 224/197, 269; 24/3.3
   See application file for complete search history.

(56) References Cited

U.S. PATENT DOCUMENTS 7,556,374 B1 *   7/2009   Cooper ........................ 351/158
7,938,533 B2 *   5/2011   Shapiro ........................ 351/112

* cited by examiner

*Primary Examiner* — Hung Dang
(74) *Attorney, Agent, or Firm* — Gary D. Topolosky (57) ABSTRACT

A vision assist device without side temples comprises a frame for holding a first vision assisting lens with a carabiner clip that extends from the frame for use as a handle. The carabiner clip has at least 3 sides, at least one of said sides including a bar with spring biasing to define a closed clip position. The carabiner clipped device can be used as reading glasses, a magnifying glass, lorgnette and/or binoculars. Optionally, the carabiner includes a switch-activated light. One preferred embodiment uses overlapping lenses to provide twice the vision correction when folded closed.

11 Claims, 6 Drawing Sheets

VISION ASSIST DEVICE WITH AN INTEGRAL CARABINER AND OPTIONAL LIGHT

FIELD OF THE INVENTION

The present invention relates to improvements in vision assist devices, including magnifying glasses, monocles, lorgnettes and binoculars. Such vision assist devices provide temporary vision correction, often for reading, cultural and/or sports related activities. A main aspect of this invention incorporates an integral carabiner, or D-clip, for attaching such devices which otherwise have no side temple frames to a user's clothing, belt loop, backpack, purse or other carried article when not in use. Another aspect adds a reading assist light to those embodiments of the invention for magnification and/or reading assistance.

BACKGROUND OF THE INVENTION

Eyeglass frames traditionally include a front portion or lens frame connected at opposed lateral ends with side pieces or temples. Each temple has a forward facing hinge (or other connector) end and a rearward facing earpiece end.

For anyone who has worn glasses for corrective vision, and for those who wear glasses for safety and/or sun shading, one of the more common complaints is that the glasses get lost when not worn. Many individuals have worn bands for suspending glasses around their necks when not in use. Others have been known to flip unworn glasses up for "riding" on their upper foreheads, or possibly resting in their hair.

Still others have considered storing unused eyeglasses on their person, but not in a storage case per se. The most commonly used storage area is the pocket of a dress shirt or other apparel item. In order to prevent glasses from sliding or falling out of such pockets, numerous clip means have been conceived and patent protected. Schmitt U.S. Pat. No. 1,779,015 was one of the first to include a firmly mounted clip nearest the front hinge region to the temple arm of an eyeglass frame. Marvin U.S. Pat. No. 1,787,830 located a similar clip further back along the temple arm for storing other items including writing utensils.

The hinge to one of the temple arms of Hon U.S. Pat. No. 2,097,371 included a purposeful clasp. McCormick U.S. Pat. No. 6,017,120 added an aesthetic hook or clip to the outside of one temple arm, said clip intended to match the rest of the temple arm in color and material of manufacture.

Others have patented after-market clips for including with many makes and models of eyeglass frame temples. McDonald U.S. Pat. No. 1,898,059 included one type of clip that could be slid to various points along the temple arm. Nagel U.S. Pat. No. 1,973,648 included an attachment fob that not only clipped to the frame wearer's shirt pocket; it also engaged with the opposite temple arm when the eyeglasses were folded "closed". Zipper U.S. Pat. No. 3,883,236 disclosed several shapes of temple arm clips, some permanent and others removable and reusable. And DiFranco U.S. Pat. No. 4,903,375 showed a plastic spring bar-type clip for attaching to a temple arm with a pair of O-ring connectors.

A spring-loaded, add-on clip from Kren U.S. Pat. No. 5,414,906 incorporated clamping jaws. Challender U.S. Pat. No. 6,029,319 included a spring-biased clip in one front corner of his eyeglass frame temple. Resendez, Sr. U.S. Pat. No. 6,045,221 added a garment-locking protrusion and recess near one end of his frame attaching clip. Should the wearer desire a wider spread for attaching unworn glasses to an automotive sunshade or the like, Maxson U.S. Pat. No. 3,038,377 provided a frame clasp that was both hinged and spring loaded.

More recently patented configurations have included clip means that are capable of pivoting about the temple component for shirt pocket mounting when not in use. See, for example, Fukai U.S. Pat. No. 6,543,895 and Goldman et al. U.S. Pat. No. 6,854,845.

There is one known application for a carabiner clip at the ear end of an eyeglass temple piece. Cooper U.S. Pat. No. 7,556,374 shows one such embodiment. In two other instances, temple-less eyewear within an integral case (folding or otherwise) are shown in McDermott U.S. Published Application Nos. 2005/0253998 and 2008/0002143.

In a broader sense, various clips are known for various products. Newler U.S. Pat. No. 6,533,414 shows a clip specifically for holding standard eyeglass frames. Fields U.S. Patent Application No. 2007/0213104 uses a detachment clip for carrying cell phones, MP3's, GPS devices and the like. A part of same is similar to the belt clip and holder mechanism of Williams U.S. Pat. No. 6,742,685. For a totally unrelated application, Sarver U.S. Pat. No. 5,433,339 included a carabiner with a cup or drinking vessel. While one online company sells a carabiner with integral light at koolatrononline.stores, there are no visual assists even remotely associated with same.

What is needed is an inexpensive means for securely attaching a vision assist device like a monocle, lorgnette and/or binocular set to one's person, said securing means not becoming easily undone. A mere spring clip along the frame temple does not suffice. A spring-loaded clip that completely closes about the attachment element, i.e., a belt loop, necklace, purse buckle, etc. provides greater security from being lost or otherwise getting disconnected. This invention would enable sportsmen, theatergoers and craftspersons (i.e. those who sew, knit or the like) to keep better track of their vision equipment. When fitted for a modifiable vision assist device, that device could provide a first magnification level when swung open to a first position, and a second (or possibly double) magnification level when swung to a second, closed or overlapping lens position. Optionally, the preceding device may include a switch-activated light for assisting with viewing the area of magnification or print being illuminated.

SUMMARY OF THE INVENTION

In a first aspect of improved eyewear in accordance with this invention, there is provided a vision assist device without side temples. The device comprises a lens surround or "frame" for holding a first vision-assisting lens together with a carabiner clip that extends from the frame for use as a handle and as a device storage assist when not in use for vision assisting. That carabiner clip has at least 3 sides, at least one of said sides including a bar with spring biasing to define a closed clip position. In some instances, that bar may be connected to one carabiner clip side with a rivet, pin or other permanent joiner means and extend to or near another carabiner clip side adjacent the clip's bar side.

The carabiner clipped device can be used as reading glasses, a magnifying glass, a lorgnette and/or binoculars. One preferred embodiment uses overlapping lenses to provide twice the vision correction when closed. Optionally, the aforementioned devices may include a switch-activated light component.

One embodiment uses the aforementioned lens overlapping arrangement as a lorgnette. For twice the vision correction assistance, the first lens may be hingedly connected to the second. In an alternative embodiment, the first lens is rotatably, or pivotally connected to the second lens.

Another embodiment of this invention improves binoculars by providing same with a carabiner clip that extends from the main binocular frame in a rotatable, slidable, or retractable manner. When needed, this clip can extend outwardly from the main frame for securely attaching the binoculars to one or more looped items on the wearer's wardrobe or other accessory item. Preferred embodiments of carabiner clips are made from plastic, metal, composite or various combinations.

BRIEF DESCRIPTION OF THE DRAWINGS

Further features, objectives and advantages of the present invention will become clearer when referring to the following detailed description of preferred embodiments made with reference to the accompanying drawings in which.

DETAILED DESCRIPTION OF PREFERRED EMBODIMENTS

It should be noted that common features in the different views of this invention are shown with the same reference numeral(s). For alternate embodiments of the same component, there is consistent numbering though in the next hundred series. When referring to any numerical range herein, it should be noted that all numbers within the range, including every fraction or decimal between its stated minimum and maximum, are considered to be fully designated and disclosed by this description. As such, disclosing one clip size ranging from about 25-35 millimeters in length would expressly cover clip sizes of 26, 27.5, 29 mm . . . and so on, up to about 33, 34 and 34.75 mm. For the same embodiment, typical clip heights may range from about 12-22 mm and total clip depths about 35-60% of the total template depth, or about 1.5-3 mm, with all intermediate numerical and/or quantitative values between being expressly covered thereby.

As used herein, the term "carabiner" means a loop with a spring or screw gate. These same devices have also been called crab rings, D-rings, snap links, or "biners" for short. On occasion, the loop can be made from a sturdy, mostly rigid plastic. More often, the carabiner's loop component is made from metal, typically 7075 aluminum. The loop part opposite the gate is often called the spine. It is meant to quickly and reversibly connect components. There are two main types of carabiners, non-locking and locking. The non-locking types have a spring (i.e., swinging gate) that can be pressed open to insert a connecting rope, strap, etc. before shutting under the spring's pressure. Locking carabiners can have the same general shape as their non-locking counterparts but with an additional sleeve around the gate. The sleeve meant for releasing along at least partially over the gate can be auto-locking. Alternately, that sleeve may include a manually threaded screw or twist-lock.

Figure 1A:
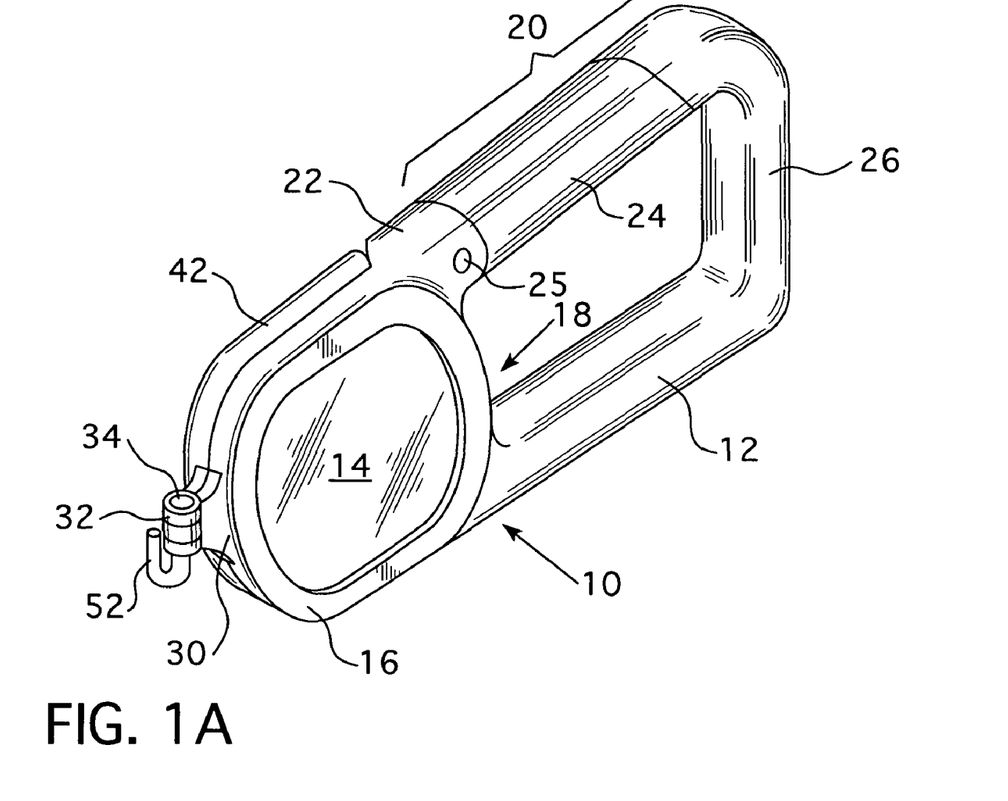
FIG. 1A is a right front, perspective view of one embodiment of vision assist device in a closed or folded over position.
Figure 1B:
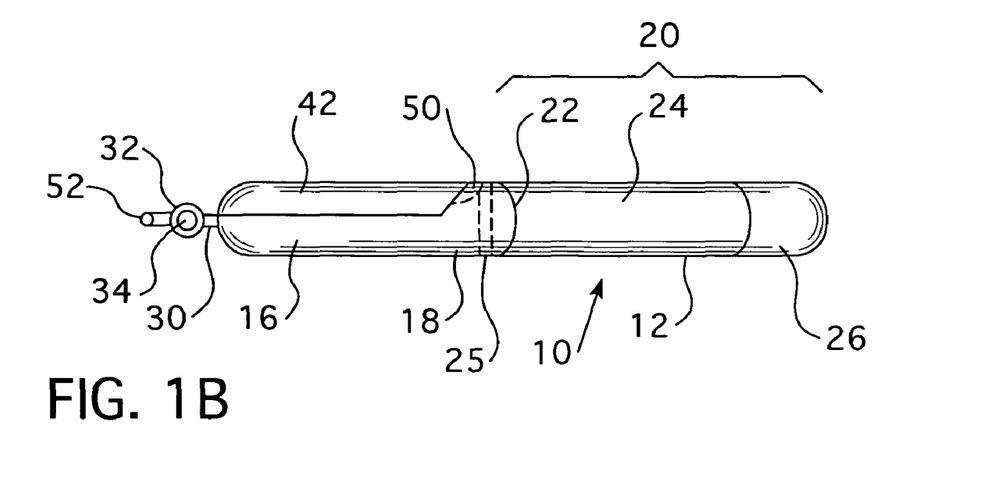
FIG. 1B is a top perspective view of the device from FIG. 1A.
Figure 2:
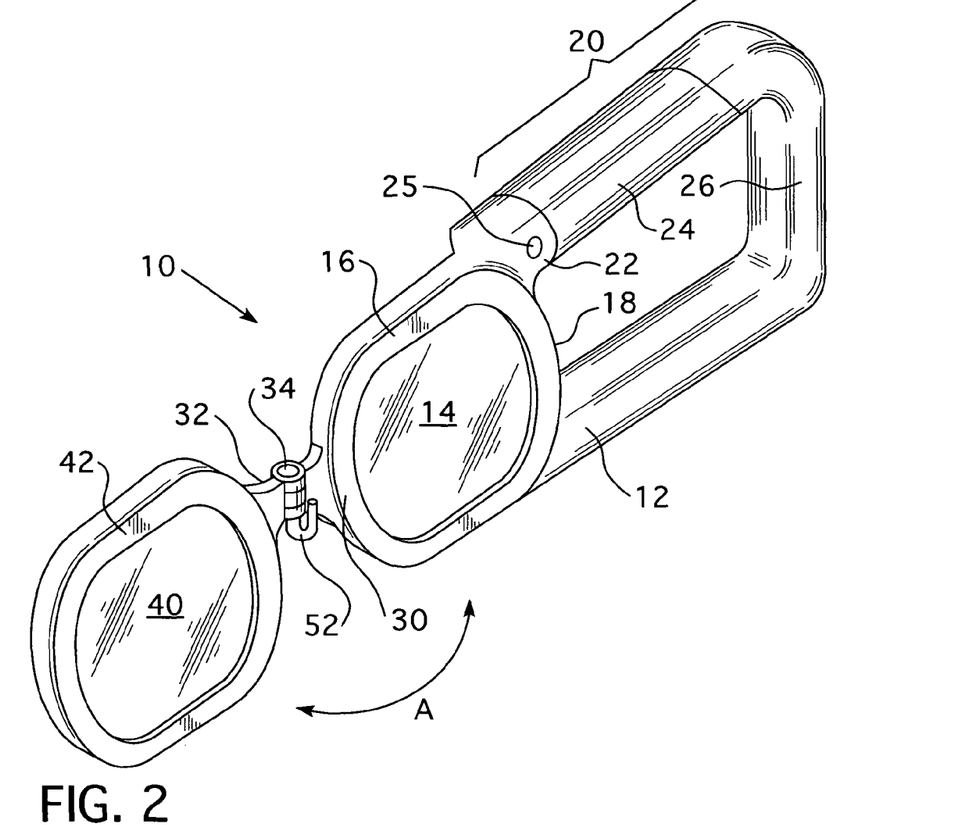
FIG. 2 is a front plan view of vision assist device from FIGS. 1A and B in an open or unfolded position.

Referring now to FIGS. 1A through 2, there is shown a first embodiment of vision assist device according to this invention. Therein, device 10 is rather atypical in that it has no side temples as would be the case with many eyeglass frames. Nevertheless, this device 10 includes a basic main frame 12. In one embodiment, main frame 12 holds a first vision assisting lens 14. A subcomponent of main frame 12 serves as a frame surround 16 for first lens 14. From a first end 18 of main frame 12, there is connected a carabiner clip 20 which can serve as a handle for the device user to hold when using said device for vision assistance, i.e. magnification, reading and the like. Carabiner clip 20 has at least 3 sides though it is to be understood that any one or more of those clip sides may end in a rounded corner rather than being straight or sharply angled to the adjoining clip side.

One embodiment of carabiner clip side 22 includes a bar 24 connected with a rivet or pin 25 at one end. In FIG. 1B, the cross-sectional path of rivet/pin 25 through the body of frame 12 is shown by dotted or dashed lines. For the present invention, bar 24 is spring biased into a defined, closed clip position. It is to be understood that spring biasing may be accomplished manually as with an actual, physical spring, or via material selection with certain metals and plastics offering sufficient rigidity to bias the clip closed and requiring some physical pressure to bias said clip sufficiently "open" for detachment. At its end opposite rivet/pin 25, bar 24 connects to an end of clip side 22 at or near its juncture with adjacent clip side 26. In other embodiments, that bar end may serve as a termination point for clip side 22 such that the bar terminates to or immediately next to adjacent clip side 26.

For added security, it is known to provide certain carabiner clip bars with slidable covers and/or threaded extensions as is shown and described in a commonly owned invention that incorporates carabiner clips into standard eyeglass frames that have a pair of side temples extending therefrom. Though not shown in the context of this invention, it is assumed that many of said "locking" principles would also suffice here.

In the embodiment depicted at FIGS. 1A through 2, there is a second frame end 30. Though shown as opposite carabiner clip-connecting, first end 18 of main frame 12, it is to be understood that alternate arrangements of clip connectors may, for aesthetics and/or user convenience, position the clip connecting first end 18 at a point other than opposite second frame end 30. Nevertheless, second frame end 30, as shown, has a substantially vertically oriented hinge 32 with central pin 34 extending there through. That hinge 32 joins the first vision-assisting lens 14 of main frame 12 to a second vision assisting lens 40. As shown, second lens 40 resides in its own lens frame surround 42 which is commonly shaped like the frame surround component 16 for first lens 14. In that manner, the two lens frame surrounds, 16 and 42 respectively, may actually overlap for providing twice the vision assisting capabilities of just a single lens, said overlap being best seen in FIGS. 1A and B. When frame surround 42 of second lens 40 is opened by a rather axial rotation about hinge 32, the device 10 provides more of a standard frame look, or like a lorgnette, with distinctly separated first and second lenses, 14 and 40, as best seen in accompanying FIG. 2. As shown, second frame surround 42 is a separate construct from the rest of main frame 12. It is to be understood, however, that alternate material selections and overall design constraints may enable a unibody construction (not shown).

Also for aesthetics, it is understood that both first lens 14 and second lens 40 may assume a variety of lens shapes including but not limited to circles, ovals, oblongs, squares, rectangles and polygons. As shown in FIGS. 1A through 2, the lenses are mostly oval when seen from a top view.

For assisting with the opening of device 10, main frame 12 may include a thumbnail notch 50 (shown with dotted lines in FIG. 1B). Furthermore, there may be a slight hinge pin extension 52 for enabling the device 10 to be "locked" or, at least more firmly, kept in an open position when being used as a dual vision-assisting device. The method of opening this device for dual vision assisting is shown by directional arrow A beneath frame 12 in FIG. 2.

Figure 3:
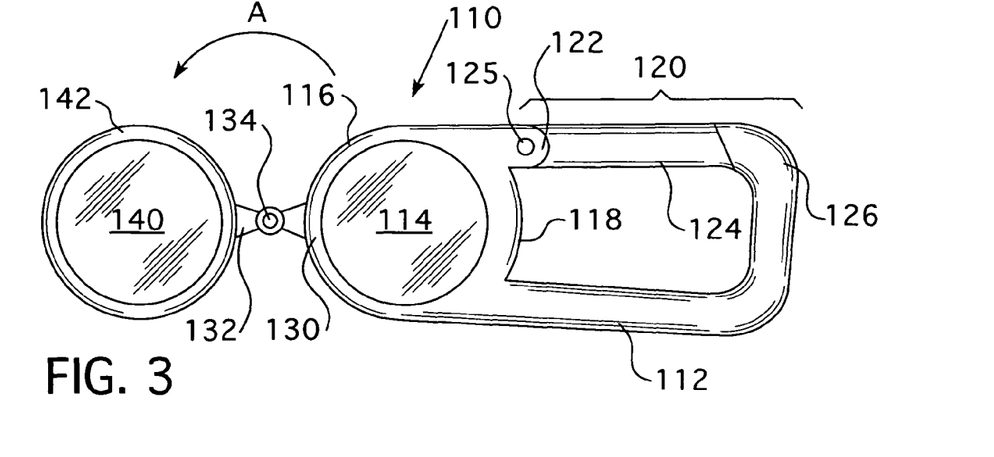
FIG. 3 is a front plan view of second embodiment of vision assist device in an open or unfolded position.

FIG. 3 shows an alternate dual lens configuration/connection. Particularly, in FIG. 3, that device 110 has a main frame 112 with first lens 114 (and its own lens surround 116) joined to second lens 140 and its sub frame component 142 with a pivotal-type hinge 132, said hinge having its own central pin 134 about which the second frame and lens may be rotated in substantially the same physical plane as main frame 112 to open up for dual eye use. Ideally, the aforementioned alternative should enable pivotal rotation in a clockwise or counterclockwise direction. A counterclockwise directional movement is shown via arrow A atop frame 112 in FIG. 3. In still other variations, rotation may be limited to only one of those directions with a central pin extension (not shown) providing some means for locking the device into an "open" position. It should be noted, however, that with the circular-shaped lenses 114 and 140 of second device 110 kept in a closed, or overlapping position, this invention can provide its user with doubly enhanced vision correction/assistance when viewing objects through the combined correction of both first and second lenses.

Figure 4:
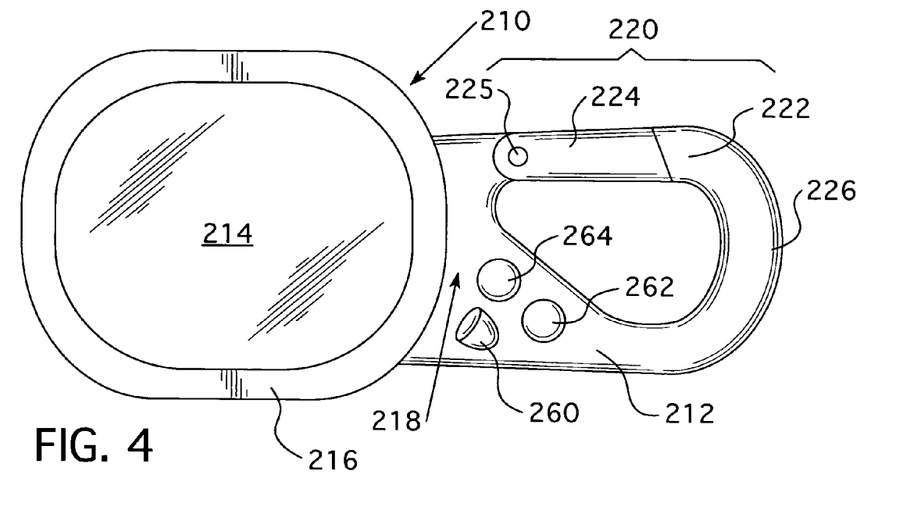
FIG. 4 is a top plan view of a third embodiment of vision assist device including a switch-activated light.

In FIG. 4, there is shown a third embodiment of vision assisting device 210 which more closely resembles a magnifying glass configuration. Though shown with enlarged, relatively round shape, lens 214 of this embodiment may also assume numerous other shapes and vision-correction levels. And while it is known to provide certain magnifying glasses with integral light arrangements, none have ever done so in the context with an integral carabiner clip as well. Particularly, the device 210 of FIG. 4 includes from one end 216 of its frame 212 a carabiner clip 220 with side 222 having its own bar 224 adjoining clip side 226 via rivet/pin 225. In this variation, device 210 further includes a raised, integral light 260 that can be turned on and off via light switches 262 and 264. One of those switches, in alternate embodiments, may enable the intensity of light 260 to be changed to various settings.

Figure 5A:
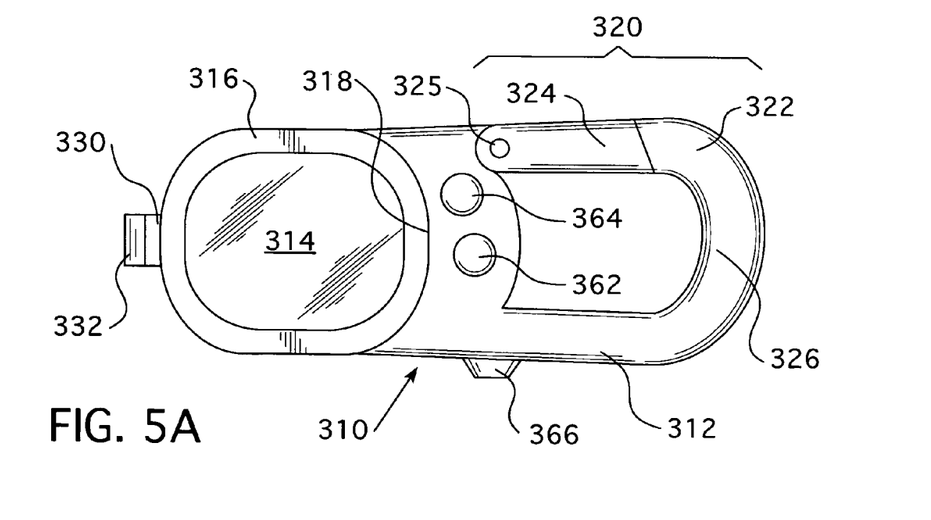
FIG. 5A is a top plan view of a fourth embodiment of vision assist device with a second variety of switch-activated light.
Figure 5B:
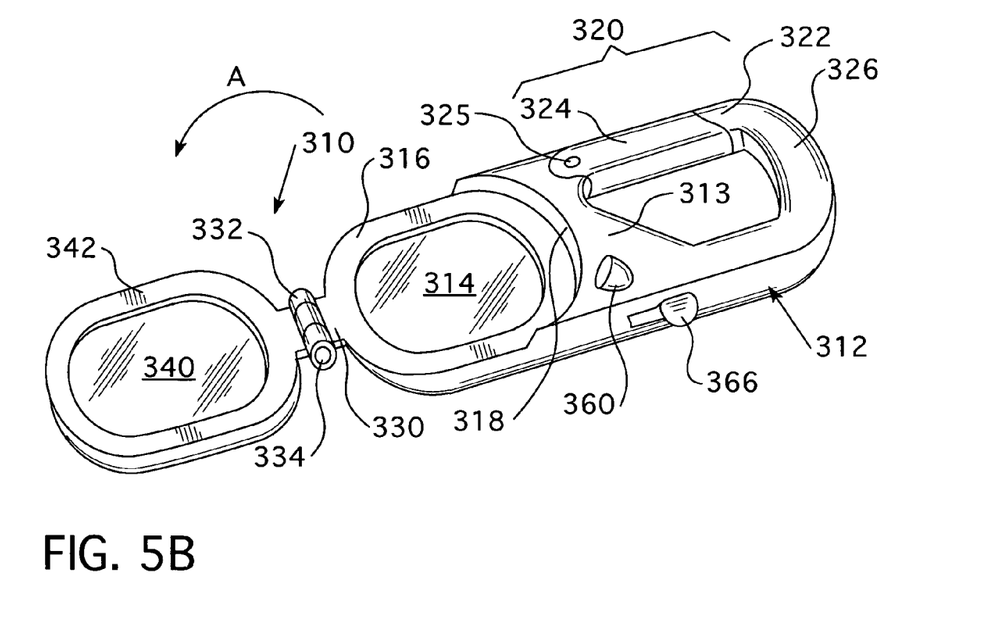
FIG. 5B is a top perspective view of the vision assist device from FIG. 5A in an open or unfolded position.
Figure 5C:
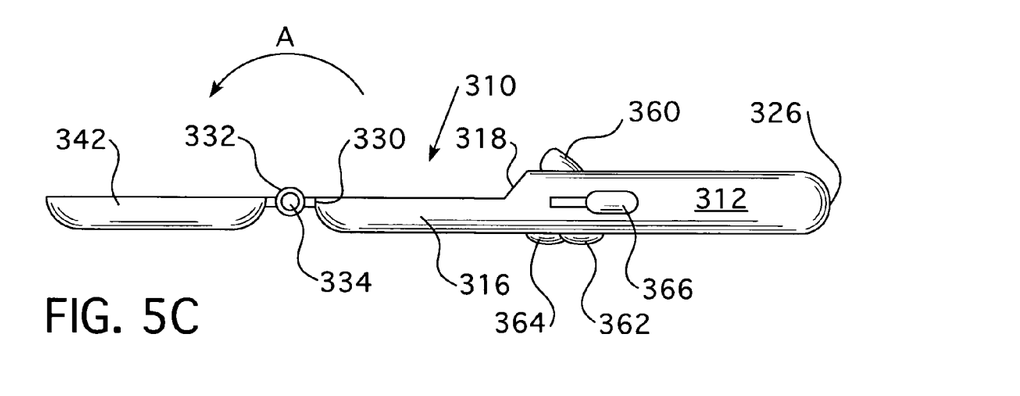
FIG. 5C is a side bottom view of the opened vision assist device from FIGS. 5A and B.

In FIGS. 5A through C, there is included with another embodiment of device 310. Much of this embodiment resembles the device of FIGS. 1A through 2, i.e., with a dual lens configuration (314, 340) about a vertically oriented hinge 332, and a carabiner clip 320 from one end 316 of its main frame 312. The relative movement of first and second lenses in this embodiment is indicated by arrows A in FIGS. 5B and C.

Further included from the bottom side 313 of main frame 312 in this embodiment of the present invention is a light assist 360 with its on-off switches 362, 364 being thumb-operable from the top to main frame 312. For changing the intensity of light 360, this embodiment shows a separate, slide switch 366 in a region of main frame 312 to which is connected the non-operable arm of carabiner clip 320.

It is important to realize that in many contexts, individual users of many vision assist devices may prefer a device-to-body connection that leaves the users hands free. For a device having a plurality of vision correcting lenses in a common case, the embodiments of FIGS. 6A through D provide a binocular-based alternative. In the first variation of same, device 410 of FIG. 6A has a main frame 412 with a carabiner clip 420 hinged from one lateral side 421 to flip up when used to clip the binoculars to one's belt loop, coat or necklace when not in use, and to flip down, if more convenient, during actual binocular use. The relative directional movement of that clip 420 is shown with arrow A in FIG. 6A. Like the earlier alternate embodiments, clip 420 includes a first clip side 422, clip bar 424, connecting rivet/pin 425 and adjoining clip side 426.

Figure 6A:
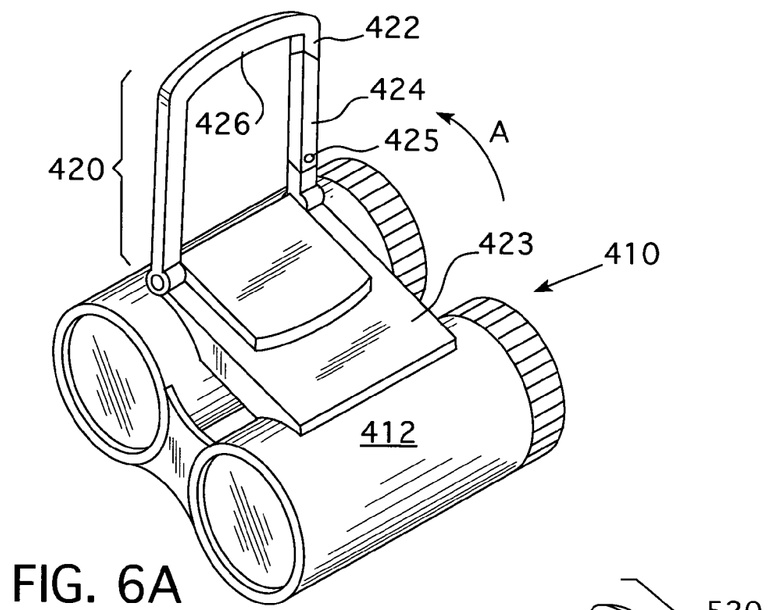
FIG. 6A is a right, top perspective view of a pair of binoculars with a first embodiment of carabiner clip incorporated therein.

Carabiner clip 420 may also serve as means for holding the binoculars during use at a cultural or sporting event. As the relative size of clip 420 when "at rest" overlaps a storage base 423 affixed to the binocular main frame 412, there may be no need for notching to assist with clip lifting. If relative clip sizing warrants, however, a notch assist may be added (not shown). Similarly, carabiner clip 420 may be outfitted with a lock assist (also, not shown) in those instances where an operator may prefer holding the binoculars from the fully extended clip as a second sort of handle.

Figure 6B:
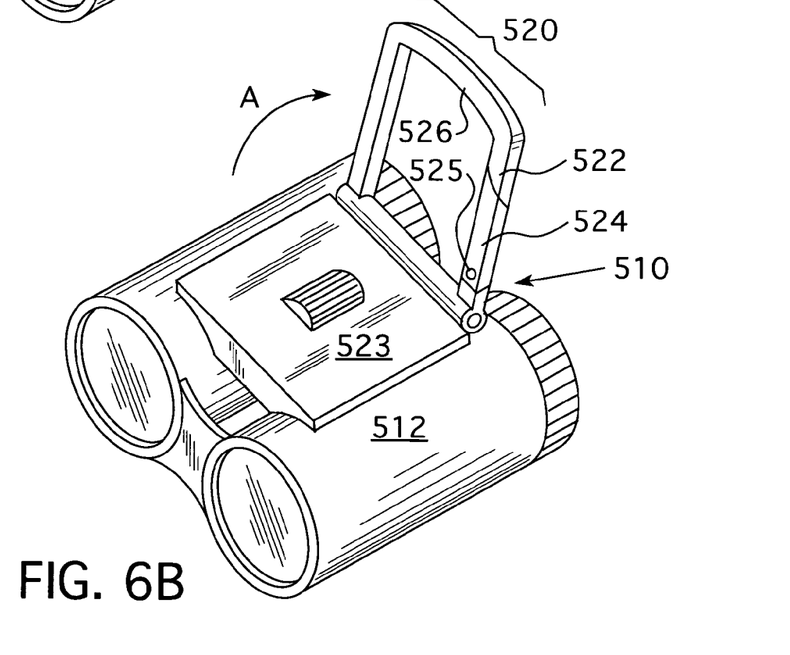
FIG. 6B is a right, top perspective view of a pair of binoculars with a second embodiment of carabiner clip.

In FIG. 6B, a similar binocular pair 510 to that in FIG. 6A is fitted with a front or rear hinged carabiner clip 520 that extends from its own storage clip base 523. The relative front-to-rear movement of that clip 520 is shown via arrow A in FIG. 6B.

Figure 6C:
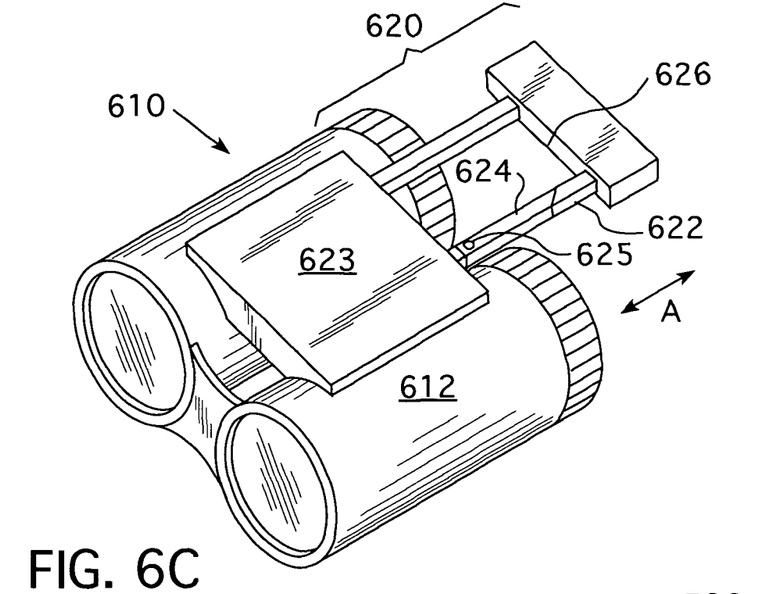
FIG. 6C is a right, top perspective view of a pair of binoculars with a third embodiment of carabiner clip.
Figure 6D:
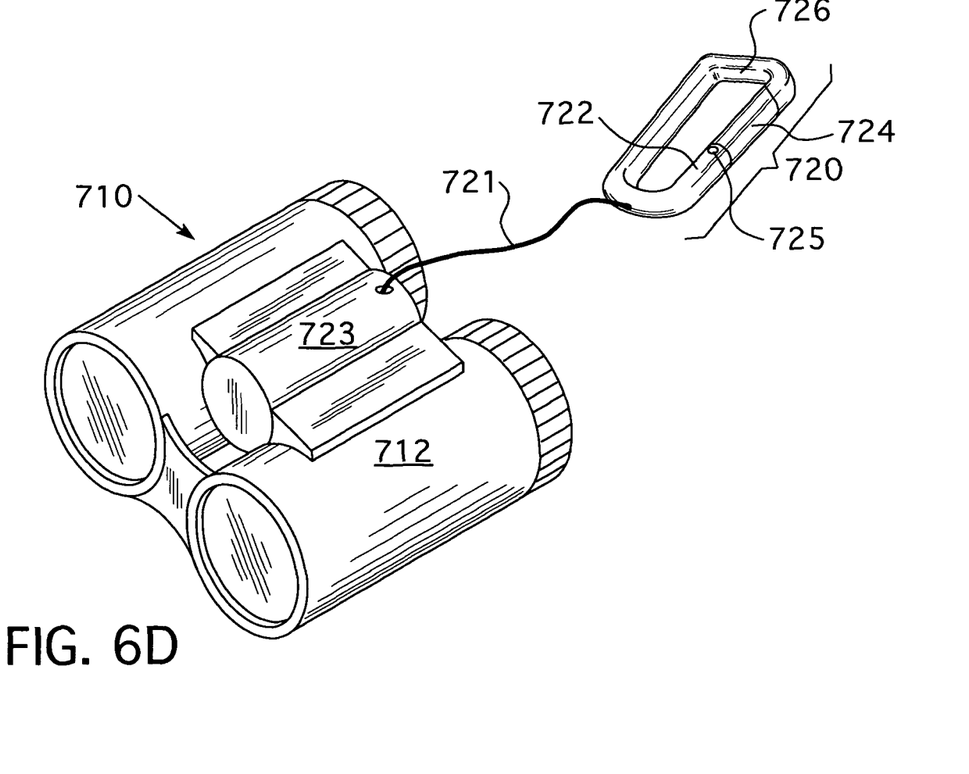
FIG. 6D is a right, top perspective view of a pair of binoculars with a fourth embodiment of carabiner clip.

A third variation of binoculars according to this invention, device 610 of FIG. 6C, slidably extends an integral carabiner clip 620 from its own binocular base 623. The relative movement of that clip 620 between open and closed positions is shown by arrow A, therein. Finally, if a longer clip connection is preferred, there is yet another embodiment of connection depicted in FIG. 6D. For that vision assist (binocular) device 710, clip 720 is hooked to a cord 721 that retracts in and out from a cord storage area within cord base 723. In certain instances, a cord length may be provided that would enable binocular use for viewing while remaining clipped to the user/wearer's belt.

The foregoing detailed description of the invention has been made with reference to several preferred embodiments. Persons skilled in the art will comprehend that minor changes and variations do not depart from the spirit and the scope of the invention defined by the following claims.

What is claimed is:

1. A vision assist device without side temples, said device comprising:
   (a) a frame for holding a first vision assisting lens; and
   (b) a carabiner clip that extends from the frame for use as a handle, said carabiner clip having at least 3 sides, at least one of said sides including a bar with spring biasing to define a closed position for said clip.

2. The device of claim 1, which is suitable for use as reading glasses or a magnifying glass.

3. The device of claim 2 wherein the frame includes a second vision assisting lens.

4. The device of claim 3 wherein the second lens is vertically hinged to a section of the frame that holds the first lens.

5. The device of claim 3 wherein the second lens is pivotally hinged to a section of the frame that holds the first lens.

6. The device of claim 3, which provides enhanced vision assisting when viewing through both the first and second lenses.

7. The device of claim 3, which forms a lorgnette when fully opened.

8. The device of claim 3 wherein the first lens has a shape selected from the group consisting of a circle, an oval, an oblong, a square, a rectangle and a polygon.

9. The device of claim 3, which includes a notch for assisting with separating the first lens from the second lens.

10. The device of claim 3, which further includes means for keeping the second lens frame locked open.

11. The device of claim 2, wherein the carabiner clip is made from a material selected from the group consisting of: metal, plastic and a composite.

* * * * *